United States Patent
Janneck et al.

(10) Patent No.: US 9,411,744 B1
(45) Date of Patent: Aug. 9, 2016

(54) CONTENT-BASED CACHING IN A MANAGED RUNTIME COMPUTING ENVIRONMENT

(75) Inventors: Jorn W. Janneck, San Jose, CA (US); Ian D. Miller, Charlotte, NC (US)

(73) Assignee: XILINX, INC., San Jose, CA (US)

( * ) Notice: Subject to any disclaimer, the term of this patent is extended or adjusted under 35 U.S.C. 154(b) by 1136 days.

(21) Appl. No.: 12/009,121

(22) Filed: Jan. 15, 2008

(51) Int. Cl.
G06F 12/02 (2006.01)
G06F 12/10 (2016.01)

(52) U.S. Cl.
CPC .................... G06F 12/1018 (2013.01)

(58) Field of Classification Search
CPC .................................................. G06F 12/1018
See application file for complete search history.

(56) References Cited

U.S. PATENT DOCUMENTS

| | | | | |
|---|---|---|---|---|
| 7,035,968 | B1* | 4/2006 | Pereira | 711/108 |
| 2002/0133668 | A1* | 9/2002 | Sherman | 711/108 |
| 2004/0123278 | A1* | 6/2004 | Nanja et al. | 717/153 |
| 2005/0066306 | A1* | 3/2005 | Diab | 717/108 |
| 2006/0184656 | A1* | 8/2006 | Roddy | 709/223 |
| 2008/0184212 | A1* | 7/2008 | Lee et al. | 717/148 |

OTHER PUBLICATIONS

"RFC 1321 (RFC1321)" Internet RFC/STD/FYI/BCP Archives RFC 1321 (rfc1321)—The MD5 Message-Digest Algorithm, 1-20 pages, MD5 RFC—http://www.faqs.org/rfcs/rfc1321.html (printed on Jun. 1, 2007).
"RFC 3174 (RFC3174)" Internet RFC/STD/FYI/BCP Archives RFC 1321 (rfc1321)—The MD5 Message-Digest Algorithm 1 (SHA1), 1-18 pages, SHA RFC—http://;www.faqs.org/rfcs/rfc3174.html (printed on Jun. 1, 2007).
"HTCP:: RFC Errata Implementations", P. Vixie, ISC, D. Wessels, NLANR, Jan. 2000, (HTCP/0.0, 1-11 pages, HTCP RFC—http://www.htcp.org (printed on Jun. 1, 2007).
Vixie, P. et al., *Hyper Text Caching Protocol (HTCP/0.0)*, RFC 2756, Jan. 2000, Internet Society, Reston, Virginia, USA.

* cited by examiner

*Primary Examiner* — Charles Rones
*Assistant Examiner* — Ryan Dare
(74) *Attorney, Agent, or Firm* — Kevin T. Cuenot

(57) ABSTRACT

A computer-implemented method of caching data in a managed runtime computing environment can include loading source data and comparing content of the source data with at least one of a plurality of cache entries. Each cache entry can include a representation of previously received source data and a transformation of the previously received source data. A transformation for the source data from a cache entry can be selected or a transformation for the source data can be generated according to the comparison. The transformation for the source data can be output.

10 Claims, 3 Drawing Sheets

CONTENT-BASED CACHING IN A MANAGED RUNTIME COMPUTING ENVIRONMENT

FIELD OF THE INVENTION

The embodiments disclosed herein relate to managed runtime computing environments. More particularly, the embodiments relate to incorporating content-based caching within a managed runtime computing environment.

BACKGROUND

Managed runtime computing environments (runtime environments) are available for a variety of different object-oriented programming languages, for example, Java™ and C#. Java™ is commonly used with the Java™ Runtime Environment (JRE) available from Sun Microsystems, Inc. of Santa Clara, Calif. C# is commonly used within the .NET Framework available from Microsoft Corporation of Redmond, Wash.

Within a runtime environment, program code can be loaded dynamically at runtime. That is, while a program is executing within the runtime environment, further program code can be dynamically loaded into the runtime environment and executed. For example, when loading a class in Java™ the data representing the class can be loaded and read. An internal object representing the class can be created within the runtime environment. Once created, the class object can be registered with the runtime environment.

In some cases, data representing a class is stored as compiled code within a file. In other cases, data representing a class can be stored at a remote location and loaded over a communication network, e.g., using Hypertext Transfer Protocol (HTTP), or loaded from a database via a database query operation. In still other cases, the data representing a class may be in some non-standard data format, requiring preprocessing during the loading and reading process. In Java™ for example, this flexibility exists because developers are permitted to create customized classloaders.

The ability to dynamically load program code within a runtime environment facilitates dynamic code generation. Rather than dynamically load compiled code, source code can be dynamically generated. The source code can be processed into binary code. A class object can be created from the binary code. Taking the JRE as an example, source data can be located, read, and compiled into a form that is usable in creating the class object. The data can be used to create an internal object representing the class within the JRE. The class object can be registered with the JRE and executed.

While the above scenario provides for a high level of system flexibility, processing source code "on-the-fly," e.g., at runtime, can be time consuming and computing resource intensive. In some instances, the time needed for processing source code can rival or surpass the time needed for performing each of the other tasks needed to implement the object class within the runtime environment combined. Dynamic processing of source code is but one example. The involvement of a preprocessing step before data can be used within a runtime environment generally imposes a penalty in terms of computing resources and time.

SUMMARY

The embodiments disclosed herein relate to managed runtime computing environments (runtime environments) and, more particularly, to incorporating content-based caching within a runtime environment. One embodiment of the present invention can include a computer-implemented method of caching data in a managed runtime computing environment. The method can include loading source data and comparing content of the source data with at least one of a plurality of cache entries. Each cache entry can include a representation of previously received source data and a transformation of the previously received source data. A transformation for the source data from a cache entry can be selected or a transformation for the source data can be generated according to the comparison. The transformation for the source data can be output.

Comparing can include determining that the source data matches a representation of previously received source data of a selected cache entry. In that case, the transformation that is output can be the transformation of the selected cache entry. When a determination is made that the source data does not match a representation of previously received source data from the cache entries, the transformation that is generated for the source data can be output.

The representation of the source data of each cache entry can be the source data itself. In that case, for example, comparing can include performing a binary comparison between the source data and the previously received source data of at least one of the plurality of cache entries. In another example, comparing can include performing a content-aware comparison of the source data and previously received source data of at least one of the plurality of cache entries.

The representation of previously received source data of each cache entry can be a message digest. In that case, a message digest can be generated from the source data according to a hashing operation. The message digest from the source data can be compared with at least one message digest of the cache entries.

The computer-implemented method also can include binding the transformation of the source data to the runtime environment, registering the transformation of the source data with the runtime environment, and executing the transformation of the source data.

Responsive to generating the transformation for the source data, the transformation can be stored along with a representation of the source data as a cache entry.

In another embodiment, each entry of the plurality of cache entries can include a transform identifier and the source data can include a transform identifier. Accordingly, comparing can include comparing the transform identifier of the source data with a transform identifier of at least one of the plurality of cache entries.

Another embodiment of the present invention can include a computer-implemented method of caching data in a runtime environment including identifying source data, loading a message digest derived from the source data, and comparing the message digest from the source data with at least one of a plurality of cache entries. Each cache entry can include a message digest corresponding to previously received source data and a transformation of the previously received source data. When a matching cache entry is found, a transformation of the matched cache entry can be selected and output. When a matching cache entry is not found, the source data can be loaded and a transformation of the source data can be generated and output.

In another embodiment, each of the plurality of cache entries can include a transform identifier. In that case, comparing further can include comparing a transform identifier associated with the source data with a transform identifier of at least one of the plurality of cache entries.

Yet another embodiment of the present invention can include a computer program product including a computer-usable medium having computer-usable program code that, when executed by an information processing system, causes the information processing system to perform the various steps and/or functions disclosed herein.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed herein relate to the use of a content-based cache within a managed runtime computing environment (runtime environment). Within a runtime environment, program code can be dynamically generated from input data, bound to the runtime environment, and executed. Often, the process of generating program code involves more than one processing phase. For example, data often is preprocessed into an intermediate format and subsequently post processed for use within the runtime environment. Often, one or more of these phases requires significant computing resources and/or considerable time to complete. This can be detrimental to fast and efficient operation of the runtime environment.

In accordance with the inventive arrangements disclosed herein, the output from a processing phase, referred to herein as a "transformation," can be stored within a content-based cache. When data is subsequently input for processing, the content-based cache can be consulted to determine whether a transformation has already been determined that corresponds to the input data. If so, the transformation can be output from the content-based cache rather than undertaking the processing phase from scratch. The processing phase may also be referred to as a "transformation process" or "transform." In any case, as the processing phase needed for generating the transformation from the input data is avoided, significant savings in terms of computing resources and time can be achieved. The transformation can be further processed and executed within the runtime environment.

Figure 1:
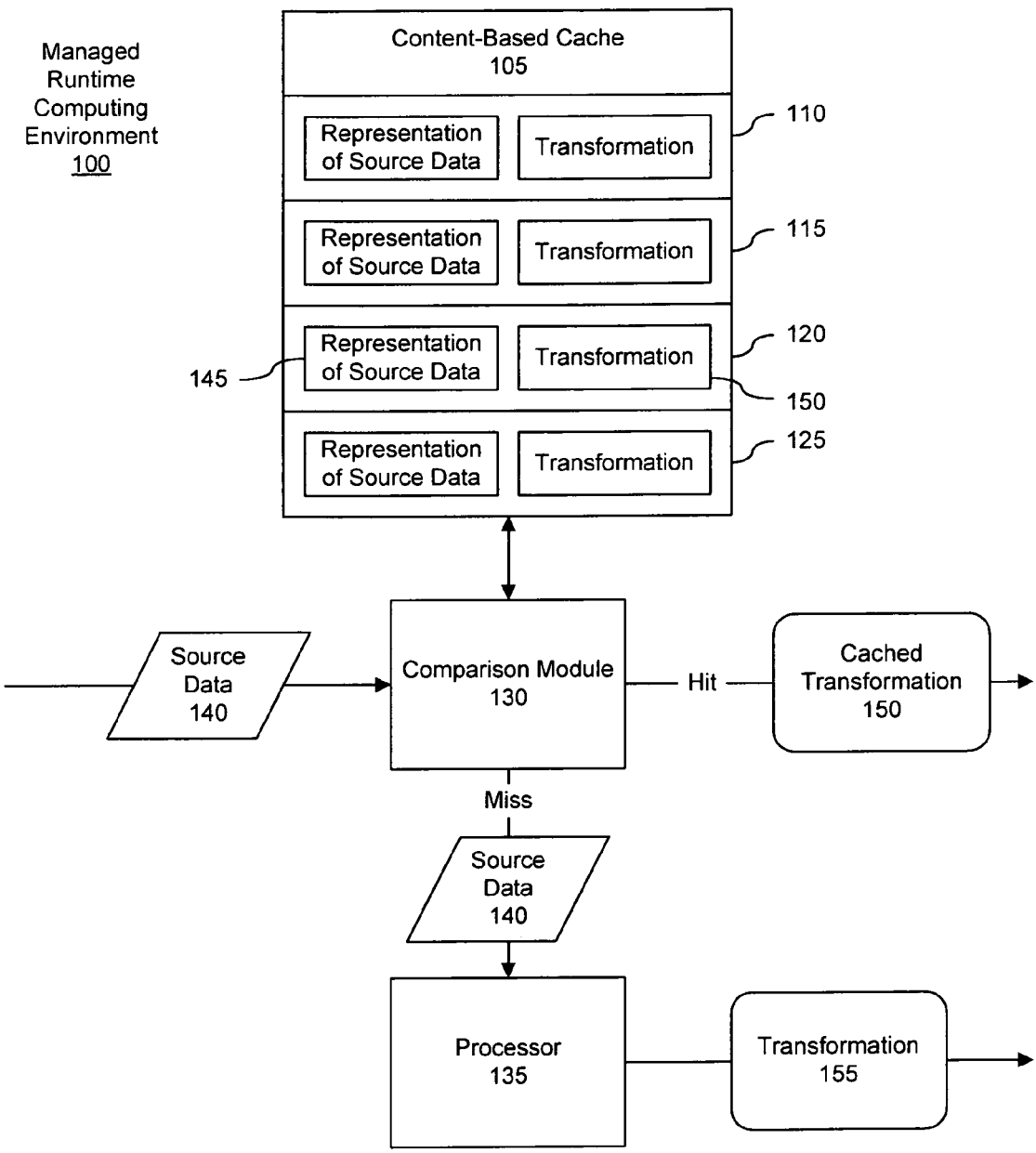
FIG. 1 is a block diagram illustrating a managed runtime computing environment (runtime environment) including a content-based cache in accordance with one embodiment of the present invention.

FIG. 1 is a block diagram illustrating a runtime environment 100 including a content-based cache 105 in accordance with one embodiment of the present invention. As used herein, a runtime environment (e.g., a managed runtime computing environment) can refer to a virtual machine which can provide software services for processes or programs while running. A virtual machine may execute at the level of the operating system or as a software application running under the control of an operating system. The runtime environment 100 can execute within a suitable data processing system, e.g., a desktop computer, a server, or the like, or within a plurality of such data processing systems configured to communicate over a communication network.

Examples of runtime environments can include, but are not limited to, the Java™ Runtime Environment (JRE), available from Sun Microsystems, Inc. of Santa Clara, Calif. or the .NET Framework, available from Microsoft Corporation of Redmond, Wash. It should be appreciated that the examples listed are provided for purposes of illustration only and, as such, are not intended to limit the embodiments disclosed herein. Other runtime environments may also be used with the embodiments to be described herein.

The runtime environment 100 can include a content-based cache 105, a comparison module 130, and a processor 135. The content-based cache 105 can include one or more entries 110, 115, 120, and 125. Each of the entries 110-125 can include a representation of source data and a transformation of that source data. The phrase "source data," as used herein, can refer to any data that is to be processed through one or more stages, e.g., a preprocessing stage and a post processing stage, before being bound and/or otherwise used within the runtime environment 100. For example, source data can refer to source code, Extensible Markup Language (XML) formatted data, other markup language formatted data, other data structures, or the like.

A "transformation," as used herein, can refer to a derivative of the source data obtained after application of a processing stage, e.g., a preprocessing stage. In one embodiment, a transformation may be used directly within the runtime environment 100. In another embodiment, a transformation may require further processing, e.g., a post processing stage, for use within the runtime environment 100. Accordingly, a transformation can include, for example, a bytecode version of the source code, a compiled binary version of source code, an XML encoded version of the source data, another sort of markup language document, an object, or the like.

As noted, each entry within the content-based cache 105 can include a representation of source data. In one embodiment, the representation of source data can be the source data itself. That is, any received source data can be stored along with the transformation derived from that source data as an entry within the content cache 105. For example, if source code is the source data, then different segments of received source code would be stored as the representation of the source data. The transformations, for instance, may be a compiled version of the source code, e.g., bytecode or binary code.

In another embodiment, the representation of source data can be a message digest derived from the source data. In that case, the message digest can be associated with the transformation of the original source data. A "message digest," as used herein, refers to a proxy for a larger message. Each message digest can be a fixed length output that can be obtained through the application of a hashing operation to the source data. The source data from which a given message digest is generated will result in a unique, or nearly unique, message digest. Accordingly, any changes to the underlying source data will be reflected in the generation of a different message digest. The message digest can be generated using any of a variety of hashing functions including, for example, Secure Hash Algorithm (SHA)-4, MD5, or the like.

In yet another embodiment, the representation of source data may include, or be augmented with, a transform identifier (ID). The transform ID can represent or indicate the particular transforming process used in generating the cache entry and, particularly, the representation of the source data. The transform ID can be used to further refine the cache key such that changes to the transforming process are reflected in the results of any comparison performed to locate an entry. The transform ID, for example, may be a version number, a unique identifier for a particular transform process that may include several discrete transform processes, or the like.

The comparison module 130 can receive and load source data 140. The comparison module 130 can compare the source data 140 with the different representations of source data in the entries 110-125 of the content-based cache 105. When the representation of the source data is the source data itself, a direct comparison of the received source data 140 with the cache entries 110-125 can be performed. If, however, the representations of source data are message digests, the source data must be processed through the application of the hashing operation. In that case, comparison module 130 can apply the hashing operation and compare the message digest derived from source data 140 with the message digests of the cache entries 110-125.

When the comparison module 130 locates a cache entry matching the source data 140, e.g., a hit occurs, the transformation from the matched cache entry can be retrieved and output. For example, if the source data 140 matches the representation of source data 145 from entry 120, transformation 150 can be selected and output as shown. As used herein, "outputting" and/or "output" can mean, for example, programmatically communicating to a runtime environment that the specified data is available for inclusion in the executing environment, writing to a file, volatile or non-volatile memory, writing to a user display or other output device, playing audible notifications, sending or transmitting to another system, exporting, or the like.

When the source data 140 does not match any entry within the content-based cache 105, e.g., a miss occurs, the source data 140 can be passed to processor 135. A transformation for source data 140 does not exist in the content-based cache 105. Processor 135 can apply a processing technique to generate a new transformation, e.g., transformation 155, which is derived from the source data 140. For example, the processing technique can include compiling the source data 140, format converting the source data 140, or the like. Though not shown, the transformation 155, along with either the source data 140 or a message digest derived from the source data 140 can be stored within the content-based cache 105 as an entry.

The runtime environment 100 can be implemented as any of a variety of different systems, whether a Java-based system or not. In one embodiment, for example, the runtime environment 100 can be included within a circuit design and/or simulation application, e.g., an electronic design automation (EDA) tool. In that case, the source data 140 may be a module, core, or other programmatic representation of a portion or component of a circuit design. The source data 140, for example, can be specified in a high level programming language, an interpreted programming language, a hardware description language, etc. In any case, the source data 140 must undergo processing to be included within a simulation, in this case the runtime environment 100.

The examples described with reference to FIG. 1 are provided for purposes of illustration only and are not intended to limit the present invention. Those skilled in the art will appreciate that the embodiments disclosed herein may be applied to any of a variety of different applications involving runtime environments. Further, the various modules of the runtime environment 100, e.g., the comparison module 130 and the processor 135, are shown to illustrate various processes that can be performed by the runtime environment 100. It should be appreciated, however, that that the modules may be implemented as a single larger application or one or both of the modules may be implemented as a plurality of smaller modules if so desired.

Figure 2:
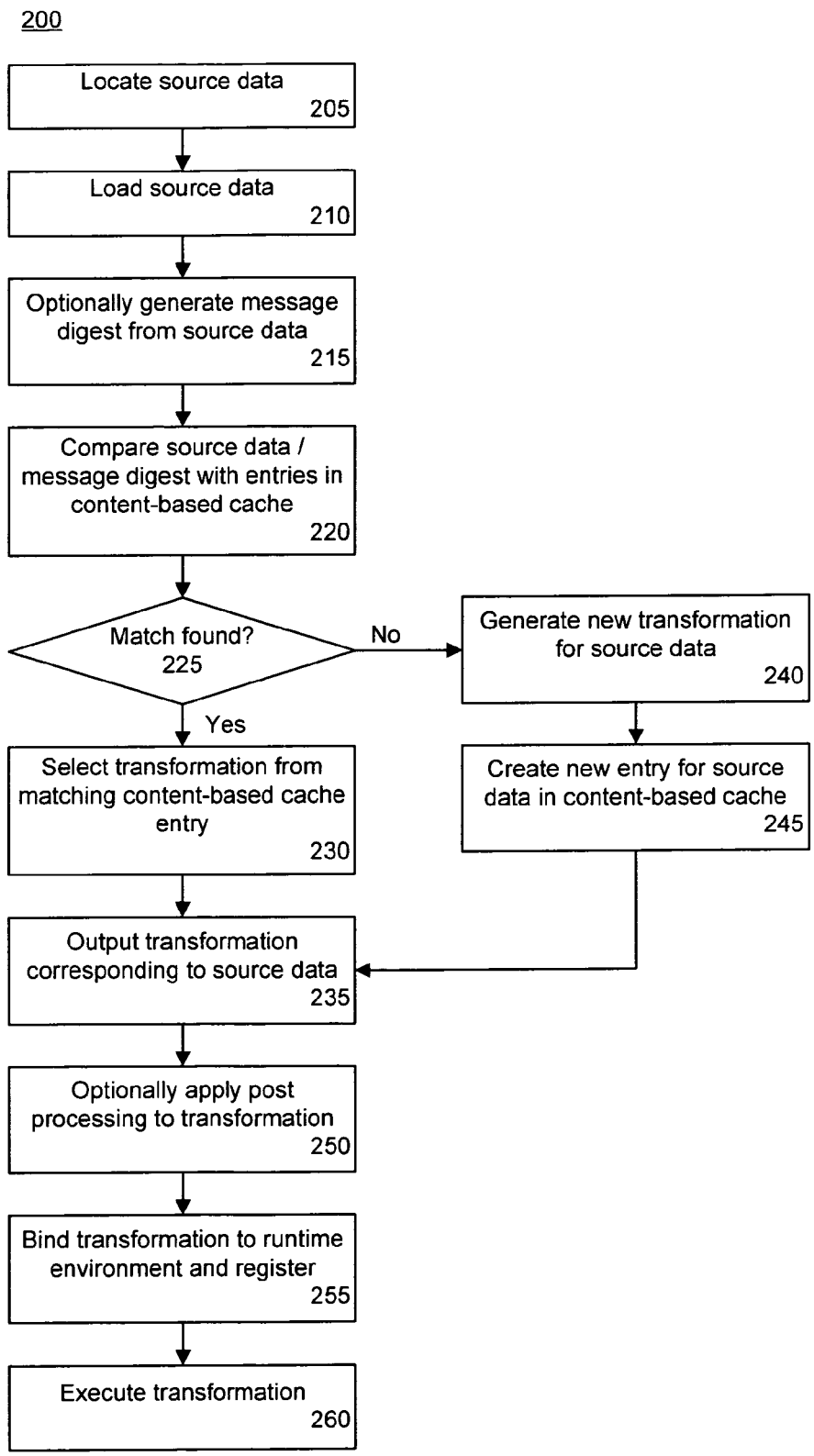
FIG. 2 is a flow chart illustrating a method of caching data within a runtime environment in accordance with another embodiment of the present invention.

FIG. 2 is a flow chart illustrating a method 200 of caching data within a runtime environment in accordance with another embodiment of the present invention. Method 200 can be implemented by a system as described with reference to FIG. 1, a classloader, or other similar component of a runtime environment. Method 200 illustrates a case in which the time needed to perform a preprocessing step, e.g., generate a transformation for source data, is significant. Each time the preprocessing step is to be implemented, for example, performance in the runtime environment may be degraded.

Method 200 can begin in a state in which a runtime environment is executing and source data, in one form or another, is to be dynamically bound to the runtime environment and executed. One or more entries may already exist in a content-based cache of the runtime environment. Each entry can include either previously received source data or a message digest derived from previously received source data. Each entry further can include a transformation already generated through the application of a preprocessing technique to the previously received source data.

Accordingly, in step 205, source data to be dynamically loaded and executed by the runtime environment can be located. In step 210, the source data can be loaded. The source data, for example, may be local to the runtime environment or remotely located. If remotely located, the data may be sent or retrieved over a communication network. In step 215, if the content-based cache used by the runtime environment relies upon message digests for comparison, the received source data can be processed using a hashing operation to generate a message digest to be used for comparison.

In step 220, the source data can be compared with the entries of the content-based cache to determine whether a match exists. As noted, in one embodiment, each entry can specify previously received source data and a corresponding transformation of the previously received source data. The source data loaded in step 210 can be compared with previously received source data specified in the entries of the content cache to determine whether a match exists. If the entries of the content-based cache include a transform ID, the source data compared with the entries of the content-based cache also may include a transform ID to be matched to an entry of the content-based cache.

In one embodiment, a binary comparison can be performed. In another embodiment, a content-aware comparison can be made. For example, if the received source data is Extensible Markup Language (XML) formatted data, an operation such as diffXML can be applied which compares content and largely ignores syntactic differences that do not influence content. Use of content-aware comparisons can lead to a higher cache hit rate.

In the case where each entry specifies a message digest and a corresponding transformation of previously received source data, the message digest derived from the source data loaded in step 210 can be compared with the message digests of the content cache entries.

In step 225, a determination can be made as to whether a matching cache entry exists. If so, the method can proceed to step 230. If not, the method can proceed to step 240. Continuing with step 230, when a matching cache entry is found, the transformation specified by the matching cache entry in the content-based cache can be selected. The transformation can be selected as the transformation that corresponds to, or matches, the source data loaded in step 210.

If no matching cache entry is found, in step 240, a new transformation for the source data loaded in step 210 can be generated. In step 245, a new entry for the source data can be made within the content-based cache. The new entry can specify the new transformation generated in step 240 and either the source data loaded in step 210 or the message digest of the source data generated in optional step 215. If so configured, a transform ID also may be included.

In one embodiment, the content-based cache is not size limited. That is, the cache may increase or decrease in size as needed within the confines or restrictions of the physical system in which the content-based cache is implemented. In that case, new entries may be added without overwriting earlier entries assuming the size of the content-based cache is within acceptable limits given physical limitations of the host system. In another embodiment, the new entry can be written into the content-based cache by overwriting the oldest entry. It should be appreciated, however, that any of a variety of cache exit criteria may be used. Accordingly, the embodiments disclosed herein are not intended to be limited to any particular technique for overwriting and/or purging entries from the content-based cache.

Continuing to step 235, the transformation corresponding to the source data loaded in step 210 can be output. When a match is found in step 225, the transformation that is output can be the cached transformation selected in step 230. Accordingly, the time required to generate a transformation of the input source data can be avoided. Alternatively, when no match is found, a newly generated transformation, e.g., the transformation generated in step 240, can be output. In step 250, post processing optionally may be applied to the transformation that is output in step 235. In step 255, the transformation can be bound to the runtime environment and registered with the runtime environment. The transformation and/or object can be executed within the runtime environment in step 260.

Figure 3:
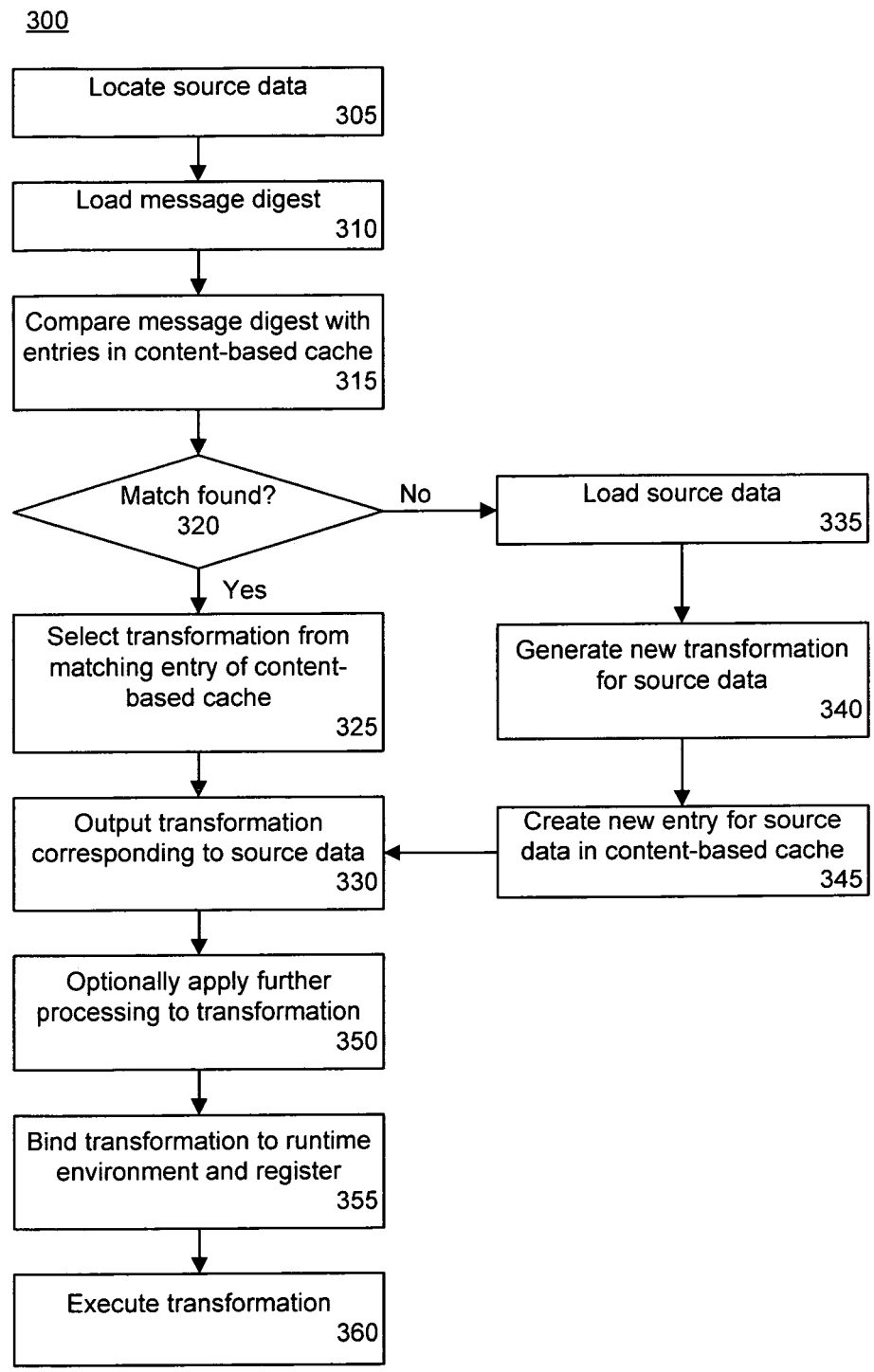
FIG. 3 is second flow chart illustrating a method of caching data within a runtime environment in accordance with another embodiment of the present invention.

FIG. 3 is a second flow chart illustrating a method 300 of caching data within a runtime environment in accordance with another embodiment of the present invention. Method 300 illustrates an embodiment in which the source data is not initially loaded or made available to the runtime environment. Method 300 illustrates a case in which both the processing required to create the transformation(s) and the time needed to load the source data or transmit the source data are significant. Accordingly, increased runtime efficiency may be obtained by avoiding the loading of source data and generation of a transformation from the source data.

Like the method of FIG. 2, method 300 can be implemented by a system as described with reference to FIG. 1, a classloader, or the like, as part of a runtime environment. Method 300 can begin in a state in which a runtime environment is executing and source data, in one form or another, is to be dynamically bound to the runtime environment and executed. One or more entries may already exist in a content-based cache of the runtime environment. Each entry can include a message digest derived from previously received source data and a corresponding transformation of the previously received source data.

In step 305, source data to be bound and executed by the runtime environment can be located. In step 310, a message digest derived from the source data can be loaded. Initially loading or transferring the message digest in lieu of the source data itself can lead to time savings in the event that a hit is determined. In step 315, the message digest can be compared with the entries of the content-based cache to determine whether a match exists. The message digest corresponding to the source data located in step 305 can be compared with message digests of entries in the content-based cache that correspond to previously received source data. If a matching cache entry is found, the method can proceed to step 325. As noted, a transform ID may be provided along with the message digest derived from the source data to be used in locating an entry of the content-based cache. In step 325, a transformation from the entry of the content-based cache that matches the message digest loaded in step 310 can be selected as the transformation for the source data located in step 305.

If no matching cache entry is found, the method can continue to step 335, where the source data can be loaded. If the source data is remotely located from the runtime environment, the source data can be loaded across a communication network, e.g., using Hypertext Transfer Protocol (HTTP) or another suitable communication protocol. As noted, the source data also may be obtained via a database query. Once loaded, a new transformation can be generated for the source data in step 340. In step 345, a new entry can be created within the content-based cache that specifies the message digest loaded in step 310 and the transformation generated in step 340. Accordingly, the transformation generated in step 340 can be said to correspond to the source data loaded in step 335 as well as the message digest loaded in step 310.

In step 330, the transformation corresponding to the message digest loaded in step 310 can be output, whether a cached transformation or newly generated as described. In step 350, post processing optionally can be applied to the transformation. In step 355, the transformation can be bound and registered with the runtime environment. The transformation can be executed within the runtime environment in step 360.

The flowcharts in the figures illustrate the architecture, functionality, and operation of possible implementations of systems, methods and computer program products according to various embodiments of the present invention. In this regard, each block in the flowcharts may represent a module, segment, or portion of code, which comprises one or more portions of computer-usable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and computer instructions.

Embodiments of the present invention can be realized in hardware, software, or a combination of hardware and software. The embodiments can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

Embodiments of the present invention further can be embedded in a computer program product, which comprises all the features enabling the implementation of the methods described herein. The computer program product can include a computer-usable or computer-readable medium having a computer-usable program code which, when loaded in a computer system, causes the computer system to perform the functions described herein. Examples of computer-usable or computer-readable media can include, but are not limited to, optical media, magnetic media, magneto-optical media, computer memory, one or more portions of a wired or wireless network through which computer-usable program code can be propagated, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A method, comprising:
    loading source code within a managed runtime computing environment, wherein the source code is in human readable form and cannot execute in the managed runtime computing environment within a computer unless at least one transformation operation is performed on the source code;
    comparing, by the computer, a message digest generated using a hashing operation from the loaded source code with at least one of a plurality of cache entries;
    wherein each cache entry comprises a message digest generated using a hashing operation of previously received source code stored in place of the source code in the cache entry, a transformation of the previously received source code comprising a bytecode version of the source code, and a transform identifier specifying a transforming process selected from a plurality of discrete transforming processes used to generate the cache entry;
    wherein comparing comprises comparing a transform identifier of the loaded source code to the transform identifiers within the at least one of the plurality of cache entries;
    selecting a transformation for the loaded source code from a cache entry according to the comparison; and
    outputting the selected transformation for the source code from the cache entry according to the comparison.

2. The method of claim 1, wherein comparing comprises determining that the source code matches previously received source code of a selected cache entry, wherein the transformation that is output is the transformation of the selected cache entry.

3. The method of claim 1, wherein comparing comprises performing a binary comparison between the source code and the previously received source code of at least one of the plurality of cache entries.

4. The method of claim 1, wherein the source code is dynamically generated during runtime.

5. The method of claim 1, wherein comparing comprises:
    comparing the message digest generated from the loaded source code with at least one message digest of the cache entries.

6. A method, comprising:
    loading a message digest and a transform identifier within a managed runtime computing environment, wherein the message digest is a hash operation of source code that is in human readable form and cannot execute in the managed runtime computing environment within a computer unless at least one transformation operation is performed on the source code, and wherein the transform identifier specifies a transforming process selected from a plurality of discrete transforming processes used to generate a transformation;
    comparing, by a computer, the message digest and the transform identifier with at least one of a plurality of cache entries, wherein each cache entry comprises a message digest generated from a hashing operation of previously received source code, a transformation of the previously received source code comprising a bytecode version, and a transform identifier specifying a transformation process selected from the plurality of discrete transformation processes used to generate the transformation in the cache entry; and
    when a matching cache entry is found, selecting a transformation of the matched cache entry and outputting the selected transformation.

7. A non-transitory computer-readable medium having computer-executable instructions stored thereon that, when executed, implement a method of caching data in a managed runtime computing environment, the method comprising:
    loading source code within a runtime computing environment, wherein the source code is in human readable form and cannot execute in the managed runtime computing environment within a computer unless at least one transformation operation is performed on the source code;
    comparing a message digest generated using a hashing operation from the loaded source code with at least one of a plurality of cache entries;
    wherein each cache entry comprises a message digest generated using a hashing operation of previously received source code stored in place of the source code in the cache entry, a transformation of the previously received source code comprising a bytecode version of the source code, and a transform identifier specifying a transforming process selected from a plurality of discrete transforming processes used to generate the cache entry;

wherein comparing comprises comparing a transform identifier of the loaded source code to the transform identifiers within the at least one of the plurality of cache entries;

selecting a transformation for the loaded source code from a cache entry according to the comparison; and outputting the selected transformation for the source code from the cache entry according to the comparison.

8. The computer-readable medium of claim 7, wherein the comparing comprises determining that the source code matches previously received source code of a selected cache entry, wherein the transformation that is output is the transformation of the selected cache entry.

9. The computer-readable medium of claim 7, wherein the comparing comprises performing a binary comparison between the source code and the previously received source code of at least one of the plurality of cache entries.

10. The computer-readable medium of claim 7, wherein the comparing comprises:

comparing the further message digest from the source code with at least message digest of the cache entries.

\* \* \* \* \*